(12) United States Patent
Schmitz

(10) Patent No.: US 11,562,158 B2
(45) Date of Patent: Jan. 24, 2023

(54) AUTOMATIC RFID ENABLED CLAY TARGET THROWING SYSTEM

(71) Applicant: Kyle Kurtis Schmitz, Norwalk, WI (US)

(72) Inventor: Kyle Kurtis Schmitz, Norwalk, WI (US)

(\*) Notice: Subject to any disclaimer, the term of this patent is extended or adjusted under 35 U.S.C. 154(b) by 0 days.

(21) Appl. No.: 17/551,004

(22) Filed: Dec. 14, 2021

(65) Prior Publication Data

US 2022/0188531 A1 Jun. 16, 2022

Related U.S. Application Data

(60) Provisional application No. 63/125,972, filed on Dec. 15, 2020.

(51) Int. Cl.
*G06K 7/10* (2006.01)
*F41J 9/18* (2006.01)

(52) U.S. Cl.
CPC ........... *G06K 7/10366* (2013.01); *F41J 9/18* (2013.01)

(58) Field of Classification Search
CPC .................................................. G06K 7/10366
See application file for complete search history.

(56) References Cited

U.S. PATENT DOCUMENTS

| 5,470,078 | A | 11/1995 | Conlan |
| 9,441,923 | B2 | 9/2016 | Chadwick |
| 2010/0279800 | A1* | 11/2010 | Zuger ............... G09B 19/0038 473/459 |
| 2021/0156652 | A1* | 5/2021 | Løkka ...................... F41J 5/10 |

FOREIGN PATENT DOCUMENTS

EP 3505862 A1 7/2019

\* cited by examiner

*Primary Examiner* — Jamara A Franklin
(74) *Attorney, Agent, or Firm* — Christopher Mayle; Bold IP, PLLC

(57) ABSTRACT

A system and method for a clay target throwing system that eliminates physical buttons and voice controls to trigger the throwing devices whereby the system receives various inputs from one or more guests at a shooting range or another type of user whereby the inputs are used to dynamically manage the various target throwing devices. The method is initiated by a guest renting a wearable device with a UHF RFID tag where the guest wearing the wearable device would then walk within a predetermined distance of a computing system having a UHF RFID reader that detects the location of the UHF RFID tag in relation to the computing system.

10 Claims, 4 Drawing Sheets

AUTOMATIC RFID ENABLED CLAY TARGET THROWING SYSTEM

CROSS REFERENCE TO RELATED APPLICATIONS

This application claims priority to U.S. Provisional Patent No. 63/125,972 filed on Dec. 15, 2020, which is incorporated herein in entirety.

FIELD OF DISCLOSURE

The overall invention is generally directed to shooting target throwing systems and more particularly to a system including shooting target throwers controlled by a computing system to dispatch targets when a guest comes within a proximity of the computing system.

BACKGROUND

Clay shooting has become an increasingly popular and growing sport of shooting flying clay targets with a shotgun or other weapon such as a bow and arrow. Hitting the target requires skill, timing, and hand-eye coordination. Clay shooting is beneficial to a person's mental and physical health. Clay shooting has many benefits including giving the user satisfaction through the adrenaline rush, strengthening the user's shoulder, arm, and hand muscles, improving balance in everyday life, as well as diverting the mind from stress, anxiety, negative thoughts, or other concerning issues. There are many commercially available clay shooting dispensers at shooting ranges and other venues where clay target shooting takes place. These clay shooting dispensers may include manual or automatic loading and throwing devices, which are designed to throw a plurality of targets from a single position. However, the user typically must manually load and release the clay shooting dispensers or press a button or other activator such as voice recognition to release the clay targets from an automatic machine. This provides an experience that is not as natural as encountering animals in the wilderness and thus exists the need for a new and improved clay target throwing system.

SUMMARY

The present disclosure is directed to a target throwing system including a wearable device, one or more target throwing devices, a control system, whereby when the wearable device comes within a distance of the control system, the one or more target throwing devices automatically release one or more targets, a speaker system connected to the control system to generate sounds that mimic wildlife, a sound database connected to the speaker system and the control system for storing the sounds that mimic the wildlife that are played by the speaker system, whereby the wearable device is a bracelet, whereby the wearable device has a UHF RFID communicator and UHF RFID tag whereby the control system has a UHF RFID reader, whereby the wearable device has a display, whereby the wearable device has an indicator, the indicator indicating when a user has been added to a target shooting challenge at a shooting bay, whereby the indicator indicates by a vibration, sound, or illumination of a light, whereby the UHF RFID tag is associated with a unique identifier in one or more shooting range databases whereby the unique identifier corresponds to a specific guest of a shooting range.

The present disclosure is directed to a target throwing system including an identification device a plurality of throwing devices, a control system, whereby when the control system determines when the identification device comes within a distance of the control system, one or more of the plurality of throwing devices release one or more targets, whereby the control system performs steps of: delaying releasing of the one or more targets, applying random number generation between the plurality of throwing devices which occurs differently every time, altering difficulty settings by setting parameters for a time delay between successive targets of the one or more targets, altering the difficulty settings by altering an angle of which the one or more targets are thrown, whereby the control system and a second control system are connected such that the releasing of the one or more targets from the plurality of throwing devices is overridden in response to crossfire caused by positioning of the one or more targets, whereby the control system and the second control system are connected such that the releasing of the one or more targets from the plurality of throwing devices is overridden in response to a distance of the identification device.

The present disclosure is directed to a target throwing system including an identification device, a plurality of target throwing device, a control system controlling multiple shooting bays, whereby when the identification device comes within a distance of the control system, the control system causes one or more of the plurality of target throwing devices of a shooting bay release one or more targets, and a speaker system connected to the control system to generate sounds that mimic wildlife, whereby the control system performs steps of: overriding releasing of the one or more targets from the plurality of target throwing devices in response to a distance of the identification device or crossfire from one or more users, delaying releasing of the one or more targets, applying random number generation between the plurality of target throwing devices which occurs differently every time, altering difficulty settings by setting parameters for a time delay between successive targets of the one or more targets, and altering the difficulty settings by altering an angle of which the one or more targets are thrown.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
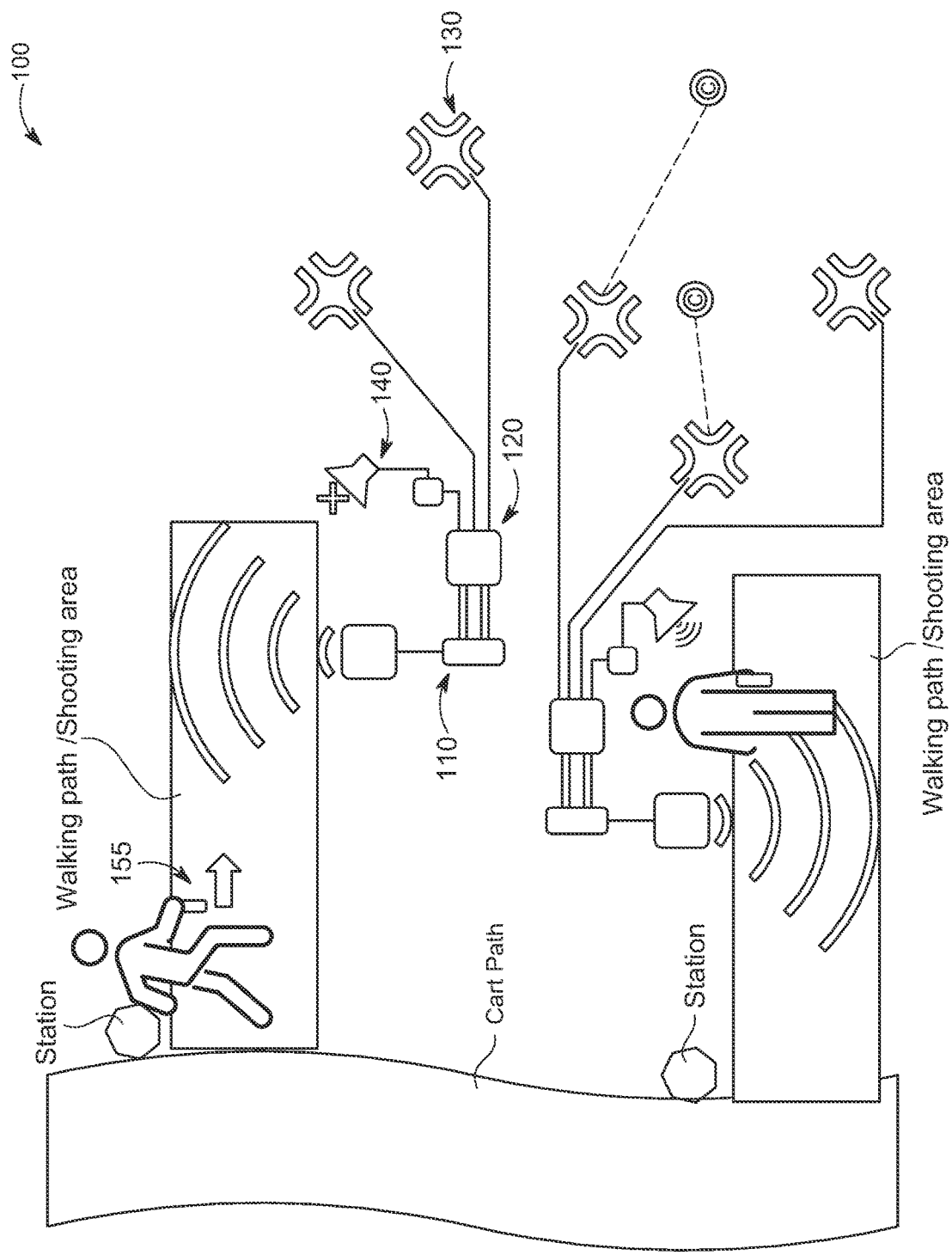
FIG. 1 depicts a schematic diagram for the clay target throwing system.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure recognizes the unsolved need for a system and method for a clay target throwing system that eliminates physical buttons and voice controls to trigger the throwing devices. In other non-limiting embodiments, this may be used for other similar targets such as a bow and arrow or crossbow. The system receives various inputs from one or more guests at a shooting range or another type of user whereby the inputs are used to dynamically manage the various target throwing devices. The method is initiated by a guest renting a wearable device with a UHF RFID tag. The guest wearing the wearable device would then walk within a predetermined distance of a computing system having a UHF RFID reader that detects the location of the UHF RFID tag in relation to the computing system. The computing system has a series of control systems to trigger an audible alarm for various programmable animal sounds and deploy one or more connected target throwing devices to release targets for the guest to shoot in a shooting bay at a shooting range.

FIG. 1 is an illustration of target throwing system 100 constructed in accordance with the principals of the current invention. Target throwing system 100 may have a plurality of systems including a control computing system 110, a relay 120, target throwing devices 130, and a speaker system 140 which may be integrated into the overall system and structure of target throwing system 100. The various systems may be individually configured and correlated with respect to each other so as to attain the desired objective of deploying targets at otherwise connected locations for a guest to shoot at.

Target throwing system 100 may have a power system that provides the power to control computing system 110, relay 120, target throwing devices 130, and speaker system 140 during the process of deploying targets to one or more targeted locations. Target throwing system 100 may be powered by methods known by those of ordinary skill in the art. In some embodiments, components of target throwing system 100 may plug into an electrical outlet using an electrical cord to supply power to control computing system 110, relay 120, target throwing devices 130, and speaker system 140. Further, the power system may include a rechargeable battery pack whereby the rechargeable battery is of a charge, design, and capacity to provide sufficient power to control computing system 110, relay 120, target throwing devices 130, and speaker system 140 while deploying targets for a set period of time.

Figure 2:
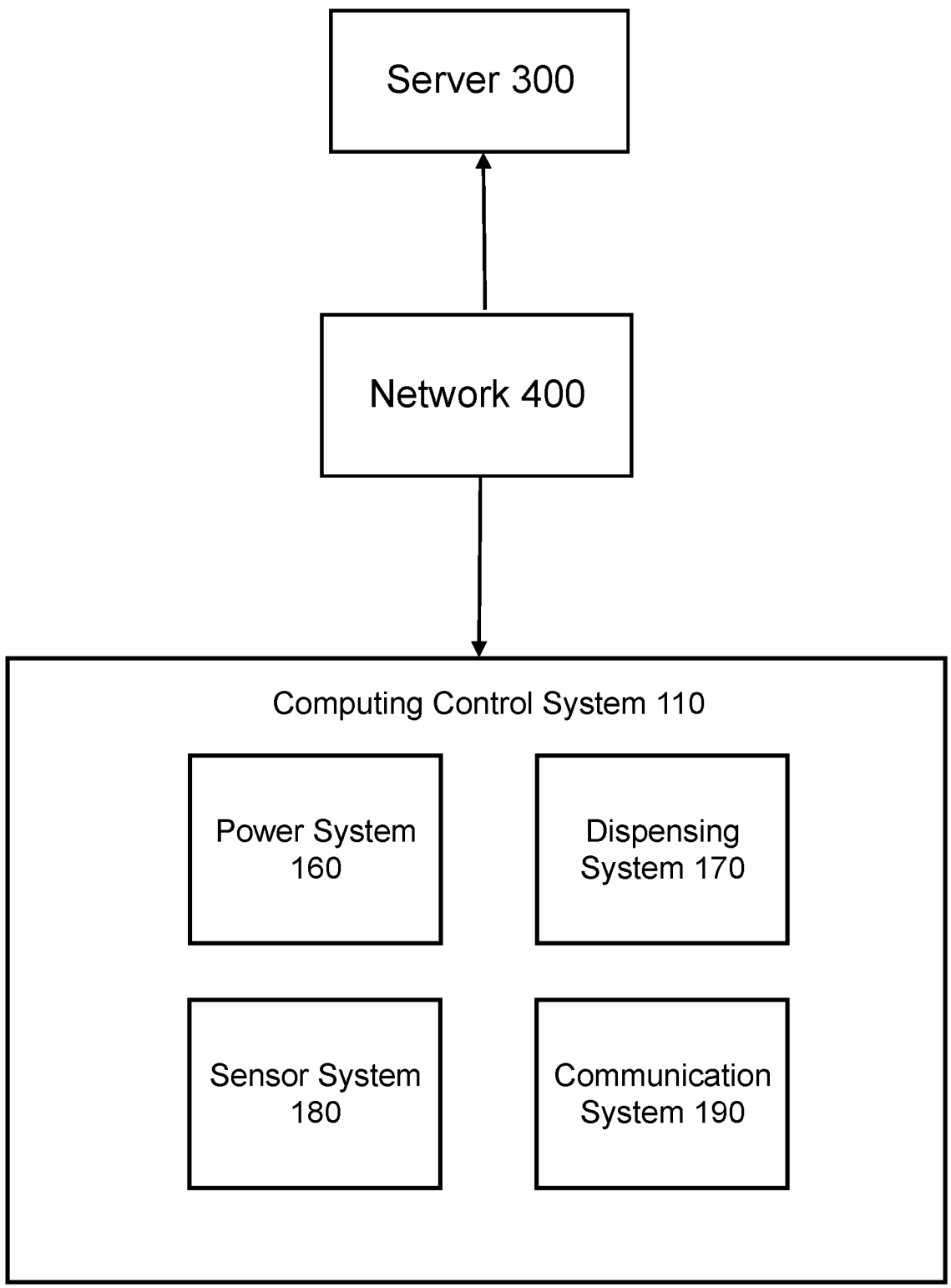
FIG. 2 depicts a block diagram of the control computing system.

Computing control system 110, shown in FIG. 2, may have one or more sub control systems operate to control the actuation of the other systems as well as handle all of the input and output control. Computing control system 110 may have a series of computing devices which will be discussed in detail later in the description. Computing control system 110 may be in the form of a circuit board, a memory or other non-transient storage medium in which computer-readable coded instructions are stored, and one or more processors configured to execute the instructions stored in the memory. Computing control system 110 may have a wireless transmitter, a wireless receiver, a UHF-RFID receiver, and a related computer process executing on the processors.

Computing devices of computing control system 110, may be any type of computing device that typically operates under the control of one or more operating systems which control scheduling of tasks and access to system resources. Computing devices may be a Raspberry Pi® or other computing devices such as but not limited to a phone, tablet, television, desktop computer, laptop computer, gaming system, wearable device electronic glasses, networked router, networked switch, networked bridge, or any computing device capable of executing instructions with sufficient processor power and memory capacity to perform operations of computing control system 110.

The one or more computing devices may be integrated into computing control system 110, while in other non-limiting embodiments, computing control system 110 may be a remotely located computing device or server configured to communicate with one or more other control systems. Computing control system 110 may also include an internet connection, network connection, and/or other wired or wireless means of communication (e.g., LAN, etc.) to interact with other components. The connection allows a guest or administrator to update, control, send/retrieve information, monitor, or otherwise interact passively or actively with Computing Control system 110.

Computing control system 110 may include control circuitry and one or more microprocessors or controllers acting as a servo control mechanism capable of receiving input from a sensor system 180 and a communication system 190, analyzing the input from sensor system 180 and communication system 190, and generating an output signal to a dispensing system 170, communication system 190, and power system 160 as illustrated in FIG. 2. The microprocessors (not shown) may have on-board memory to control the power that is applied to dispensing system 170, power system 160, and communication system 190 in response to input signals from the guest and from sensor system 180.

Computing control system 110 may be used as a single controller or with a multiplicity of controllers arranged in a myriad of configurations. Each set of these controllers may be connected hierarchically to provide data passage from the lower-level controllers to the higher-level controllers, from the higher-level controllers to the lower-level controllers, or any combination thereof to build, layer by layer. The lower-level controllers may be responsive to the supervisory control of the higher-level controllers whereby if the control system 110 is motivated by the lower-level controllers to cause an action in one or more action systems, the action may be overridden by the higher-level controllers. Thus, computing control system 110 causes an action in one or more action systems motivated by the higher-level controllers. Computing control system 110 may have an overriding system that makes adjustments to reference value ranges in order to resolve the conflict and allow target throwing system 100 to function properly with multiple components and different user settings as well as safety protocols when operating in conjunction with a plurality of other computing control system 110 at a shooting range.

Computing control system 110 may include circuitry to provide an actuable interface for a guest to interact with, including switches and indicators and accompanying circuitry for an electronic control panel or mechanical control panel. Such an actuable interface may present options to the guest to select from that would allow the guest to control settings related to deploying targets. Computing control system 110 may be preprogrammed with any reference values by any combination of hardwiring, software, or firmware to implement various operational modes, including but not limited to temperature wind, and humidity values.

The microprocessors in computing control system 110 may also monitor the current state of circuitry within control system 110 to determine the specific mode of operation chosen by the guest. For instance, when "on," the microprocessors may begin autonomously dispensing targets at predetermined intervals. Further, such microprocessors that may be part of computing control system 110 may receive signals from any of or all systems, including without limitation, a wearable device, relay 120, speaker system 140, and target throwing devices 130. Such systems may be notified whether any of the components in the various systems need to be replaced, whether the target throwing devices 130 needs to be replenished, as well as when the targeted location has been compromised by something outside the parameters, such as another guest.

In some embodiments, computing control system 110 may be in communication with one or more servers such as server 300 over one or more networks such as network 400 connected to communication system 190. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 may have a number of modules that provide various functions related to communication system 190. Modules may be in the form of software or computer programs that interact with the operating system of server 300 whereby data collected in databases as instruction-based expressions of components and/or processes under communication system 190 may be processed by one or more processors within server 300 or another component of communication system 190 as well as in conjunction with execution of one or more other computer programs.

Modules may be configured to receive commands or requests from wearable devices 155, server 300, and outside connected devices over network 400. Server 300 may comprise components, subsystems, and modules to support one or more management services for communication system 190.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital computing devices such as GSM, GPRS, UMTS, AMPS, TDMA, or CDMA. In one or more non-limiting embodiments, different types of data may be transmitted via network 400 via different protocols. In alternative embodiments, computing devices may act as standalone devices or they may operate as peer machines in a peer-to-peer (or distributed) network environment.

Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if, for instance, they are in a remote location not accessible by other networks.

Figure 3:
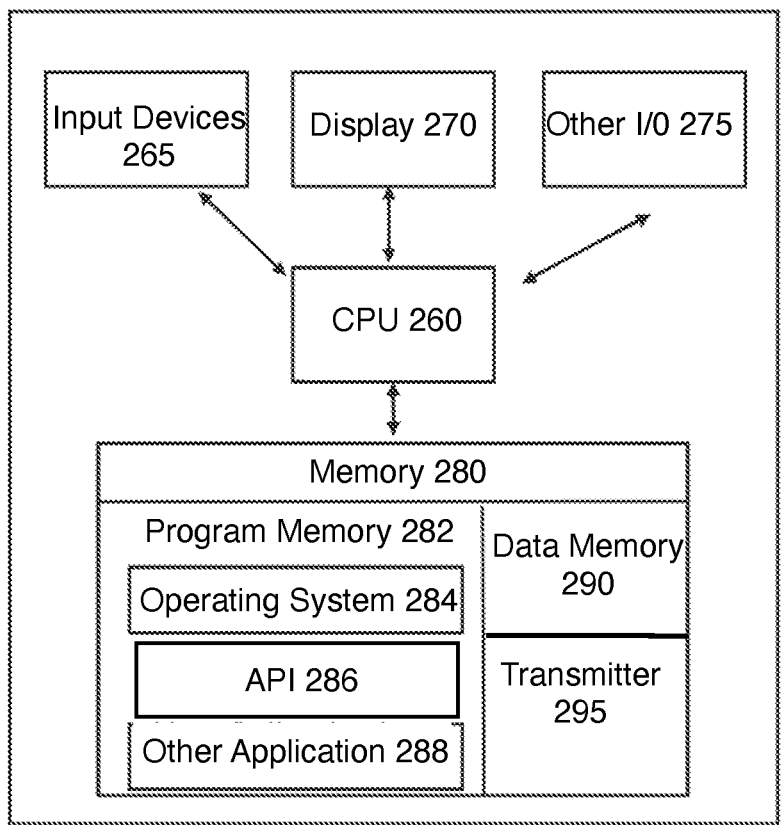
FIG. 3 depicts a block diagram for the computing device.

Turning to FIG. 3, FIG. 3 is a block diagram showing various components of a computing device of computing control system 110. Computing control system 110 may comprise a housing for containing one or more hardware components that allow access to edit and query communication system 190. Computing devices may include one or more input devices such as input devices 265 that provide input to a CPU (processor) such as CPU 260 of actions related to the guest. Input devices 265 may be implemented as a keyboard, a touchscreen, a mouse, via voice activation, wearable input device, a camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a guest.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of the computing device.

Computing devices may have a transmitter, such as transmitter 295. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Relay 120 may be in the form of a solid-state relay (SSR) or other compatible relay may be connected to computing control system 110 whereby the solid-state relay operates as an electronic switching device to the various other components. Relay 120 may have a sensor which responds to an appropriate input (control signal from computing control system 110), a solid-state electronic switching device which switches power to the load circuitry, and a coupling mechanism to enable the control signal to activate this switch. Relay 120 may be designed to switch either AC or DC loads.

One or more target throwing devices 130 may be positioned remotely from computing control system 110 around the shooting bay. For example, while a target throwing device 130 may be positioned any distance from computing control system 110, it is commonly positioned many feet or many hundreds of feet from computing control system 110. Computing control system 110 may be in communication, either wired or wireless, with any portion or components of the target throwing devices 130. Target throwing devices 130 may be any type of target throwing devices known by those of ordinary skill in the art whereby target throwing devices 130 are able to dispense targets at multiple angles in relation to the guest. In one example, computing control system 110 may control up to eight (8) target throwing devices 130. However, this is a non-limiting and computing control system 110 may control any number of target throwing devices 130. At the shooting range, target throwing system 100 may include a plurality of computing control systems 110 for each shooting bay or for each active guest whereby each computing control system is capable of controlling a plurality of target throwing devices 130.

Computing control system 110 may have any number of specific target dispensing instructions, e.g., to dispense one or more targets from target throwing devices 130. Computing control system 110 may have a built-in clock to keep track of the time and/or date and the targets shot. Computing control system 110 may allow for solo shooting, combination shooting, and shooting from multiple target throwing devices 130. Computing control system 110 may employ a delay, thereby allowing the guest to delay launching of the targets for a period of time after activation. Other delays may be based on any other predetermined length. Computing control system 110 may apply random number generation between multiple target throwing devices 130 which will occur differently every time computing control system 110 is operated. Computing control system 110 may apply or alter difficulty settings whereby computing control system 110 may set parameters for the time delay between successive discs thrown as well as the difficulty of the angle of the discs that are thrown. Computing control system 110 may connect with other computing control systems 110 and wearable devices 155 such that target throwing devices 130 deployment may be overridden for safety if another guest comes within a certain distance that they would be harmed by crossfire. Computing control systems 110 may deploy targets from target throwing devices 130 in unison with one another or in other synchronized patterns.

Computing control system 110 may be connected to speaker system 140 by a mp3 player or other electronic device having one or more computing systems capable of storing audio in one or more databases. The MP3 player may be connected to speaker system 140 positioned in the shooting bay to allow for the passage of sound in the surrounding area that mimics wildlife of which a guest would shoot at when in the actual wilderness. Speaker system 140 may be designed for weatherproofing if the speaker becomes wet. Computing control system 110 may have the necessary circuitry to amplify and convert the signal to speaker system 140.

In one or more non-limiting embodiments, target deployment is mediated via guest devices such as active wearable devices 155 (e.g., bracelets, wearable tags, necklaces or badges, etc.) that are carried by or associated with the guests and that interact with control computing system 110 to permit guests to begin to shoot targets deployed from connected target throwing devices 130. In this manner, guests may enjoy the shooting range or other location without carrying paper tickets, credit cards, or other payment methods. For example, guests at a shooting range may not wish to bring their phone or other personal device that may get damaged whereby a wearable device may be a more convenient way to manage the information.

When guests arrive at the shooting range, the guests may be provided with active wearable devices 155 among other items, such as a shooting range map, instructions, and amenities instructions. Informational media (e.g., audio, video) and instructional signage may be present at the shooting range to explain to the guest proper procedure for obtaining and using the active wearable devices 155. In other instances, guests may have obtained wearable devices 155 prior to arrival at the shooting range and may skip the step of acquiring the wearable devices 155 at the shooting range.

Once the guest enters the shooting range with the wearable device 155, the guest may initiate deployment of the targets by walking to an entry point for a designated shooting bay. Once the guest walks to the entry point, wearable device 155 may notify them (e.g., via a tone, vibration, or illuminator) of being added to the target shooting challenge at the shooting bay.

Figure 4:
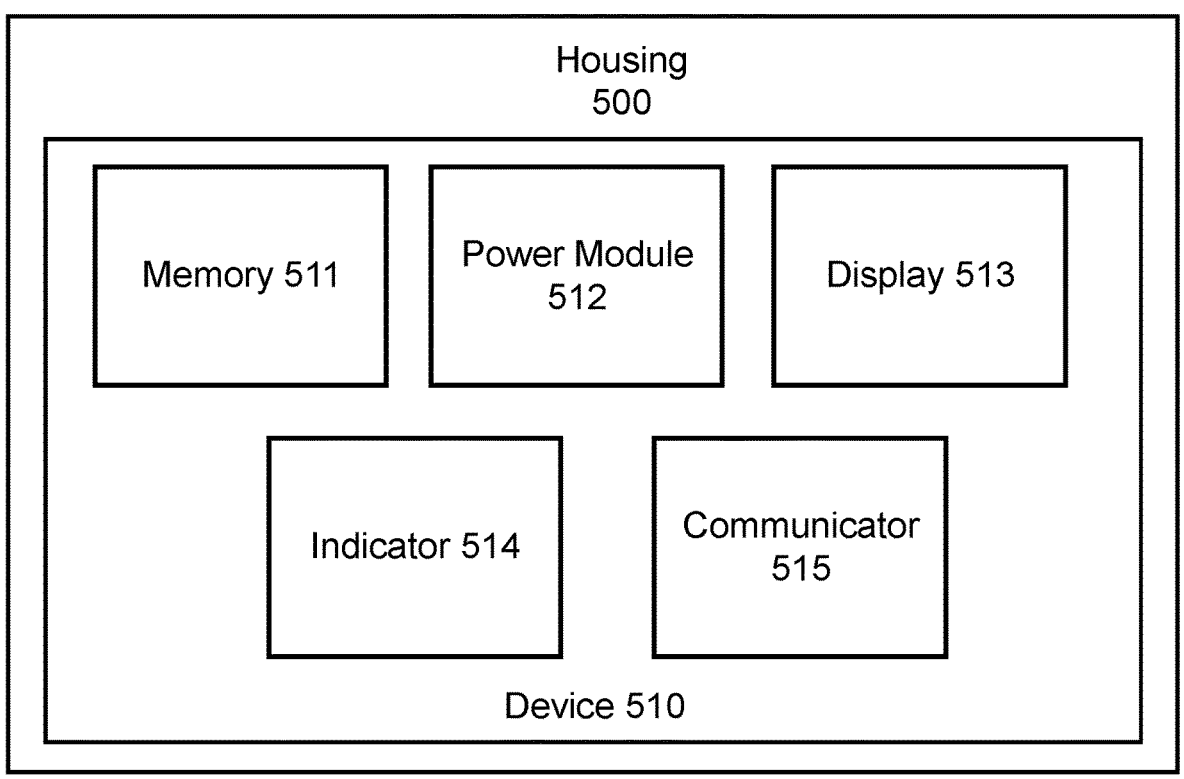
FIG. 4 depicts a block diagram of the wearable device.

Wearable device 155 may include a housing 500 as illustrated in FIG. 4. Wearable device 155 may be a bracelet. However, in other embodiments, wearable device 155 may include a necklace, a headband, a ring, or other conveniently wearable article. A device 510 may be imbedded in the housing 500. Device 510 may include several separate or unified components that perform certain functions with respect to wearable device 155. In the illustrated embodiment, the device 510 includes a memory/identifier 511, a power module 512, a display 513, an indicator 514, and a long-range communicator 515.

Long-range communicator 515 may be implemented as UHF RFID communicators that are active or passive. In some embodiments, the memory/identifier 511 may include an identifier (e.g., an UHF RFID tag) which the target throwing system 100 associates with a guest. UHF RFID readers on computing control system 110 may establish location awareness for guest heat mapping and tracking in operation at the shooting range. The device 510 may operate to at least receive information from computing control system 110 to provide the guest with information (e.g., the amount of challenges left on their account). Further, indicator 514 (e.g., a light, a vibration mechanism, or an audio feature) may provide feedback to the guest. Specifically, the device 510 may communicate by the UHF RFID reader integrated into computing control system 110.

Wearable device 155 may be designed as a one-size fits all for average children to adults. Wearable device 155 may be configured to facilitate communication with software databases in computing control system 100 (such as databases including guest information). Guests may be given a wearable, which is connected to shooting range databases such that the guest's unique guest account may be accessed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A target throwing system comprising:
   a wearable device;
   one or more target throwing devices; and
   a control system, wherein when the wearable device comes within a distance of the control system, the one or more target throwing devices automatically release one or more targets, wherein a UHF RFID tag is associated with a unique identifier in one or more shooting range databases wherein the unique identifier corresponds to a specific guest of a shooting range.

2. A target throwing system comprising:
   an identification device;
   a plurality of throwing devices; and
   a control system, wherein when the control system determines when the identification device comes within a distance of the control system, one or more of the plurality of throwing devices release one or more targets, wherein the control system performs steps of: delaying releasing of the one or more targets.

3. The target throwing system of claim 2, wherein the control system is connected to a second control system.

4. The target throwing system of claim 3, wherein the control system and the second control system are connected such that releasing of the one or more targets from the plurality of throwing devices is overridden in response to crossfire caused by positioning of the one or more targets.

5. The target throwing system of claim 3, wherein the control system and the second control system are connected such that releasing of the one or more targets from the plurality of throwing devices is overridden in response to a distance of the identification device.

6. A target throwing system comprising:
   an identification device;
   a plurality of throwing devices; and
   a control system, wherein when the control system determines when the identification device comes within a distance of the control system, one or more of the plurality of throwing devices release one or more targets, wherein the control system performs steps of: applying random number generation between the plurality of throwing devices which occurs differently every time.

7. A target throwing system comprising:
   an identification device;
   a plurality of throwing devices; and
   a control system, wherein when the control system determines when the identification device comes within a distance of the control system, one or more of the plurality of throwing devices release one or more targets, wherein the control system performs steps of: altering difficulty settings by setting parameters for a time delay between successive targets of the one or more targets.

8. The target throwing system of claim 7, wherein the control system performs the steps of: altering the difficulty settings by altering an angle of which the one or more targets are thrown.

9. A target throwing system comprising:
   an identification device;
   a plurality of target throwing devices;
   a control system controlling multiple shooting bays, wherein when the identification device comes within a distance of the control system, the control system causes one or more of the plurality of target throwing devices of a shooting bay release one or more targets, wherein the control system causes an overriding of releasing of the one or more targets from the plurality of target throwing devices in response to a distance of the identification device or crossfire from one or more user.

10. A target throwing system comprising:
    an identification device;
    a plurality of throwing devices; and
    a control system, wherein when the control system determines when the identification device comes within a distance of the control system, one or more of the plurality of throwing devices release one or more targets, wherein the control system performs steps of: altering difficulty settings by altering an angle of which the one or more targets are thrown.

* * * * *